(12) United States Patent
Nagai et al.

(10) Patent No.: US 6,393,064 B1
(45) Date of Patent: May 21, 2002

(54) COMMUNICATION METHOD, DATA TRANSMISSION METHOD AND DATA COMMUNICATION SYSTEM

(75) Inventors: Tetsuya Nagai, Yokohama; Naoya Morita, Fujisawa; Masahide Morozumi, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/108,404

(22) Filed: Jul. 1, 1998

(30) Foreign Application Priority Data

Jul. 9, 1997 (JP) .............................. 9-197973
Jul. 18, 1997 (JP) ............................ 9-208352

(51) Int. Cl.⁷ .............................................. H04L 27/00
(52) U.S. Cl. ....................................... 375/259; 370/464
(58) Field of Search ................................ 375/220, 222, 375/259, 132, 356; 370/321, 326, 347, 442, 468, 470, 473, 474, 475, 476, 510, 464; 395/850; 455/507, 519, 557, 560, 561, 102

(56) References Cited

U.S. PATENT DOCUMENTS

| | | | | |
|---|---|---|---|---|
| 5,473,668 A | * | 12/1995 | Nakahara | 455/465 |
| 5,577,087 A | | 11/1996 | Furuya | |
| 5,678,173 A | * | 10/1997 | Mihara | 455/5.1 |
| 5,839,077 A | * | 11/1998 | Kowaguchi | 455/517 |
| 5,892,910 A | * | 4/1999 | Safadi | 709/217 |
| 5,903,592 A | * | 5/1999 | Itaya | 375/200 |
| 5,930,235 A | * | 7/1999 | Arai | 370/252 |
| 6,014,406 A | * | 1/2000 | Shida et al. | 375/202 |
| 6,034,967 A | * | 3/2000 | Citta et al. | 370/443 |
| 6,111,889 A | * | 8/2000 | Osada | 370/461 |

FOREIGN PATENT DOCUMENTS

| | | |
|---|---|---|
| EP | 0574273 | 12/1993 |
| EP | 0774850 | 5/1997 |
| JP | 5-130082 | 5/1993 |
| JP | 7-58983 | 6/1995 |
| JP | 8-274756 | 10/1996 |

* cited by examiner

*Primary Examiner*—Chi Pham
*Assistant Examiner*—Bayard Emmanuel
(74) *Attorney, Agent, or Firm*—Lowe Hauptman; Gilman & Berner, LLP

(57) ABSTRACT

To perform communication at a higher speed than in the past using a new communication device without giving influence on the existing slave communication device, on a master device of a communication system such as PHS, there are provided two series of modulators and demodulators for conventional speed and for higher speed, the two different speeds being changeable by a changeover switch. A slave device to be added newly is also designed in almost the same configuration. In the link setup phase, an information to request change of modulation method is notified together with a request of communication from the slave device to the master device. From the master device, an information to specify time slots to be used in the communication phase and an information to specify modulation method are notified to the slave device. In the communication phase, communication is performed using the modulation method and the time slots as specified. The slave device can select the modulation method corresponding to the transmitting speed as required. In case the modulation method is not specified from the slave device, the same modulation method as that of the link setup phase is used in the communication phase, and the existing slave device not equipped with the means to specify the modulation method can be used without any change.

17 Claims, 12 Drawing Sheets

COMMUNICATION METHOD, DATA TRANSMISSION METHOD AND DATA COMMUNICATION SYSTEM

BACKGROUND OF THE INVENTION

1. Field of the Invention

The present invention relates to a method of communication for transmitting digital information in time division multiplex frame to perform one-to-multiple digital communication, and in particular, to a method of communication, which is used in mobile wireless communication system such as personal handyphone system (PHS) or in local area network (LAN), in which modulation method can be selected.

The present invention also relates to a data transmission method and a data communication system for data transmission to transmit digital information on time division multiplex frame, and in particular, to a communication system, by which information can be transmitted at high speed when necessary.

2. Description of the Prior Art

As communication system for performing one-to-multiple digital communication, there are mobile wireless communication system such as portable telephone or wire communication system such as LAN. Description is given now on examples of conventional type communication method referring to FIG. 4 and FIGS. 11 to 13. As system configuration, there are one master device and a plurality of slave devices. A transmission frame in the direction to transmit from the master device to the slave device is called here a downward transmission frame, and a transmission frame in reverse direction is called an upward transmission frame. The upward and the downward frames use different carrier frequencies.

FIG. 4 shows a configuration of a transmission frame. The transmission frame is in 2.5 ms cycle in both upward and downward transmissions and comprises 4 time slots. Transmission capacity of one time slot is for 50 symbols in the downward frame and 40 symbols in the upward frame. Ten symbols of the upward transmission frame are for guide time to absorb propagation delay. Because QPSK (quadrature phase shift keying) capable to transmit 2 bits per symbol is used as modulation method in this transmission, transmission of 40 kb/s in downward transmission and 32 kb/s in upward transmission can be transmitted for one time slot.

FIG. 11 shows a configuration of a conventional type master device. Reference numeral 701 represents a data processing unit to exchange transmitting and receiving data and to allocate time slots. Reference numeral 702 represents a frame generating unit to assemble the downward frame using base band. Reference numeral 703 represents a QPSK modulator, and 704 a transmission antenna. Numeral 705 represents a receiving antenna, and 706 a QPSK demodulator. Numeral 707 represents a frame disassembling unit, which is in charge of frame synchronizing of the upward frame and divides the data to each time slot and delivers the data to the data processing unit 701.

FIG. 12 shows a configuration of a conventional type slave device. Reference numeral 801 represents a receiving antenna, and 802 represents a QPSK demodulator. Numeral 803 represents a frame disassembling unit, which is in charge of frame synchronizing of the downward frame and divides the data for each time slot and delivers the data to a data processing unit 804. The data processing unit 804 picks up only the data of time slot directed to it and outputs it, and further generates information for starting communication and inputs communication data and delivers the data to a time slot generator 805. The time slot generator 805 outputs a base band signal at time slot timing, at which transmission of the data from the data processing unit 804 is allowed. Reference numeral 806 represents a QPSK modulator, and 807 represents a transmitting antenna.

Next, description will be given on operation of this conventional example. FIG. 13 shows an outline of the operation. Communication is performed in two phases: a link setup phase and a communication phase. In the link setup phase, each of the master device and one slave device uses a time slot TS0 exclusively used for link setup and commonly possessed by the slave devices to request starting of communication or exchange information such as time slot numbers used in actual communication. In the subsequent communication phase, communication is performed with the time slot specified in the link setup phase. FIG. 13 shows an example where TS2 is specified. In the conventional communication method, communication is preformed in this manner.

FIG. 14 shows a configuration of a conventional type communication system. In FIG. 14, the conventional communication system comprises a center device 50 and a plurality of terminal devices 51 to 53.

FIG. 15 shows a configuration of a conventional type center device. The conventional type center device comprises a data processing unit 601 for exchanging data to be transmitted or received and for inputting or outputting data, control information, etc., a frame generating unit 602 for assembling a downward frame with base band according to the information from the data processing unit 601, a QPSK modulator 603, a transmitting antenna 604, a receiving antenna 605, a QPSK demodulator 606, and a frame disassembling unit 607 for performing frame synchronizing of an upward frame, picking up various types of information from the frame and delivering the data to the data processing unit 601.

FIG. 16 shows a configuration of a conventional type terminal device. The conventional type terminal device comprises a receiving antenna 901, a QPSK demodulator 902, a frame disassembling unit 903 for performing frame synchronizing of a downward frame, dividing various types of information in the frame, and delivering the data to the data processing unit 904, a data processing unit 904 for picking up and outputting only communication information directed to own station, generating an information to start communication, inputting communication data and delivering the data to a frame generating unit 905, a frame generating unit 905 for assembling an upward frame with base band according to the information from the data processing unit 904, a QPSK modulator 906, and a transmitting antenna 907.

In the following, description will be given on communication from the center device to the terminal devices 51 to 53, while description on communication in reverse direction is not given here because the same applies to the communication in reverse direction.

FIG. 17 shows a configuration of a data transmission method for transmitting data from the center device 50 to each of the terminal devices 51 to 53. In FIG. 17, the frame comprises a common unit 81, which contains a frame synchronizing pattern 82 and a control unit 83 and to be received by all terminal devices, and an information unit 84 to be received only by a specific terminal device. This frame is transmitted by π/4 shift QPSK.

Each of the terminal devices performs symbol synchronizing and frame synchronizing using the synchronizing pattern 82. Then, after having seen the content of the control unit 83, it is judged whether the information unit 84 is directed to itself or not. Accordingly, the center device can send information to any of the terminal devices if the terminal device to communicate is specified to the control unit 83.

However, the first-mentioned conventional communication method as described above is disadvantageous in that communication speed is constant, and it is not possible to provide transmission service at higher speed. To increase communication speed, it is necessary to change to a transmission mode at higher transmission speed, and all of the master device and the slave devices must be renewed. However, this requires much cost and results in waste of money because a slave device usable at lower transmitting speed also must be renewed to a device with higher transmitting speed.

In addition, in the second-mentioned conventional type data transmission method as described above, it is disadvantageous in that the speed of the information unit is constant and high-speed data transmission cannot be carried out. Also, to provide a new communication system for high-speed transmission, higher cost is required.

SUMMARY OF THE INVENTION

To solve the above first-mentioned problems of the conventional method, it is a first object of the present invention to provide a method of communication for providing high-speed transmission service by simply renewing only the master device and the slave devices, which are used for high-speed communication.

To solve the above second-mentioned problems, it is a second object of the present invention to provide a data transmission method and a data communication system, by which it is possible to transmit information at high speed when necessary.

To attain the first object, the communication method according to the present invention is characterized in that a modulation method to be used is specified in the link setup phase in addition to a free or empty time slot number and communication is carried out by this modulation method in the communication phase. If the modulation method is not specified, communication is carried out in the communication phase by the same modulation method as in the link setup phase.

Therefore, it is possible according to the present invention to provide transmission service at higher speed than in conventional system if a communication method capable to provide transmission at higher speed than the modulation method used in the link setup phase is specified in the communication phase because the slave devices not requiring high speed transmission can be used without any change, and no surplus cost is required.

To attain the above second object, according to the present invention, a modulation method of a communication information unit in the frame is turned to a modulation method having higher number of transmittable bits per unit time than the common unit when information is to be transmitted at high speed. Specifically, in case high-speed transmission is performed, the center device notifies the terminal device concerned that high-speed transmission is started from now on by the conventional modulation method using the communication information unit of the frame, and the terminal device to receive the frame demodulates the communication information unit depending upon the information using a demodulation unit corresponding the modulation method for high-speed transmission. As a result, it is possible to receive the information at higher speed.

In a conventional type terminal device not provided with the function to receive information at high speed, the common unit is transmitted by the conventional modulation method, and it is possible to maintain frame synchronizing and to receive the common unit. In this case, in the conventional type terminal device, the demodulation result of the communication information unit is indefinite in case of high-speed transmission, but there is no problem because no high-speed transmission is performed to the conventional type terminal device, which is not provided with a receiving means for receiving information at high speed.

The present invention provides a communication method for performing one-to-multiple digital communication between a master device and a plurality of slave devices, using a downward transmission frame to transmit from the master device to the slave device and an upward transmission frame to transmit from the slave device to the master device, at least one of the downward and upward transmission frames has a plurality of time slots, whereby, in a link setup phase at the start of communication, an information to specify time slot to be used in a communication phase is transmitted using one time slot each of the upward transmission frame and the downward transmission frame modulated by a first modulation method, and in case high-speed communication is performed, an information to specify a second modulation method to provide transmission at higher speed than the first modulation method is transmitted, and in case high-speed communication is not performed, an information to specify the same second modulation method as the first modulation method is transmitted, or the information to specify the second modulation method is not transmitted, and in the subsequent communication phase, communication is performed using the time slot specified in the link setup phase and by the second modulation method, and, in case there is no information to specify the second modulation method, communication is performed using the first modulation method, and a modulation method to provide high-speed communication can be selected.

The present invention also provides a communication method, wherein carrier frequency of a transmission frame using the second modulation method used in the communication phase is different from carrier frequency of the transmission frame used in the link setup phase, number of the time slots can be increased, and an exclusive carrier frequency can be used in the communication phase of high-speed transmission.

The present invention also provides a communication method, wherein multivalued number of modulation of the second modulation method is higher than the multivalued number of modulation of the first modulation method, and a multivalued modulation method at higher speed can be selected.

The present invention provides a communication method, wherein a symbol rate of the second modulation method is higher than a symbol rate of the first modulation method, and a modulation method with symbol rate of higher speed can be selected.

The present invention provides a master device for performing communication using the communication method, wherein said master device comprises a data processing unit for exchanging data to be transmitted or received and for allotting time slots, a frame generating unit for inputting transmission data from the data processing unit and for assembling a downward frame with base band, a plurality of modulators having different modulation methods, a first changeover switch for connecting the frame generating unit to one of a plurality of modulators, a transmission interface means leading to a transmission line, a second changeover switch for connecting the modulator connected to the first changeover switch of the transmission interface means, a receiving interface means for receiving data from the transmission line, a plurality of demodulators for demodulating signals with different modulating methods, a frame disassembling unit for performing frame synchronizing of the upward frame, dividing the data to each time slot and delivering the data to the data processing unit, and a third changeover switch for connecting one of a plurality of demodulators to the frame disassembling unit, whereby communication can be carried out by switching over to the modulators and the demodulators capable to perform high-speed communication.

The present invention provides a slave device for performing communication by the communication method, wherein the slave device comprises a data processing unit for picking up only data of the time slot directed to own station from received signal and for outputting the data, and for inputting transmission data and delivering the data to a time slot generator, a time slot generator for outputting a transmission data base band signal from the data processing unit to a time slot, in which transmission is allowed, a plurality of modulators having different modulation methods, a first changeover switch for connecting the time slot generator to one of a plurality of modulators, a transmission interface means for transmitting to a transmission line, a second changeover switch for connecting the modulator connected to the first changeover switch to the transmission interface means, a receiving interface means for receiving data from a transmission line, a plurality of demodulators for demodulating signals having different modulation methods, a frame disassembling unit for performing frame synchronizing of a downward frame, dividing the received data to each time slot and delivering the data to the data processing unit, and a third changeover switch for connecting one of a plurality of demodulators to the frame disassembling unit, whereby communication can be carried out by switching over to the modulators and the demodulators capable to provide high-speed communication.

The invention is characterized in that, in the communication of a center device and a plurality of terminal devices, data transmission from the center device to the terminal device is performed by a frame at a given cycle, the frame comprises a common unit to be received by all terminal devices and an individual unit to be received by a part of the terminal devices, the common unit is to be transmitted by a first modulation method and the individual unit is transmitted by a second modulation method having higher number of transmittable bits per unit than the first modulation method, and the invention has such an effect that information can be transmitted at higher speed than the conventional data transmission method.

The present invention provides a data transmission method, wherein the first modulation method is π/4 shift QPSK and the second modulation method is 16 QAM, and the invention has such an effect that information can be transmitted at higher speed than the conventional type data transmission method.

The present invention provides a data transmission method, wherein the first modulation method is π/4 shift QPSK and the second modulation method is 8 PSK, and the invention has such an effect that information can be transmitted at higher speed than the conventional type data transmission method as in the case of the invention according to the above.

The present invention provides a data transmission method, wherein a symbol rate of the second modulation method is made equal to a symbol rate of the first modulation method. By making the symbol rate of the second modulation method equal to that of the first modulation method, it is easier to maintain symbol synchronizing even in a conventional type terminal device and the required frequency range can be maintained as in the past.

The present invention provides a data transmission method, wherein the first modulation method is π/4 shift QPSK and the second modulation method is 16 QAM. In addition to the effect provided by the invention, it has such an effect that information can be transmitted at higher speed than the conventional data transmission method.

The present invention provides a data transmission method, wherein the first modulation method is π/4 shift QPSK and the second modulation method is 8 PSK. In addition to the effect provided by the invention, it has such an effect that information can be transmitted at higher speed than the conventional data transmission method.

The present invention provides a data communication system between a center device and a plurality of terminal devices, whereby the center device provides a frame at a given cycle, the frame comprises a common unit to be received by all terminal devices and an individual unit to be received by a part of the terminal devices so that the data can be transmitted from the center device to the terminal devices, the common unit is modulated by a first modulation method, the individual unit is modulated by a second modulation method having higher number of transmittable bits per unit time than the first modulation method, while, in a part of the terminal devices as described above, the common unit is demodulated by a first demodulation method corresponding to the first modulation method, and the individual unit is demodulated by a second demodulation method corresponding to the second modulation method. It has such an effect to transmit information at higher speed than the conventional data transmission method.

The present invention provides a center device in a data communication system between a center device and a plurality of terminal devices, whereby the center device at least comprises a frame forming means for forming a frame at a given cycle, the frame comprises a common unit to be received by all of the terminal devices and an individual unit to be received by a part of the terminal devices so that data can be transmitted from the center device to the terminal devices, a first modulation means for modulating the common unit by a first modulation method, and a second modulation means for modulating the individual unit by a second modulation method having higher number of transmittable bits per unit time than the first modulation method. By providing such a center device, the invention has an effect that information can be transmitted at higher speed than the conventional data transmission method.

The present invention provides a data communication system for performing data transmission from a center device to a plurality of terminal devices, the center device forms a frame at a given cycle, the frame comprises a common unit to be received by all terminal devices and an individual unit to be received by a part of the terminal devices at a given cycle, the common unit is modulated by a first modulation method, and the individual unit is modulated by a second modulation method having higher number of transmittable bits per unit time than the first modulation method, whereby a terminal device in a part of the terminal devices as described above at least comprises a first demodulation means for demodulating the common unit by a first demodulation method corresponding to the first modulation method, and a second demodulation means for demodulating the individual unit by a second demodulation method corresponding to the second modulation method. By providing such a terminal device, the invention has such an effect that information can be transmitted at higher speed than the conventional data transmission method.

BRIEF DESCRIPTION OF THE DRAWINGS

These and other objects and features of the present invention will become more readily apparent from the following detailed description taken in conjunction with the accompanying drawings in which.

DETAILED DESCRIPTION OF THE PREFERRED EMBODIMENTS

In the following, detailed description will be given on embodiments of the communication method according to the present invention referring to FIGS. 1 to 6.
(1st Embodiment)

A first embodiment of the present invention is a communication method, in which an information to specify a modulation method to be used in a communication phase is notified in a link setup phase.

Figure 1:
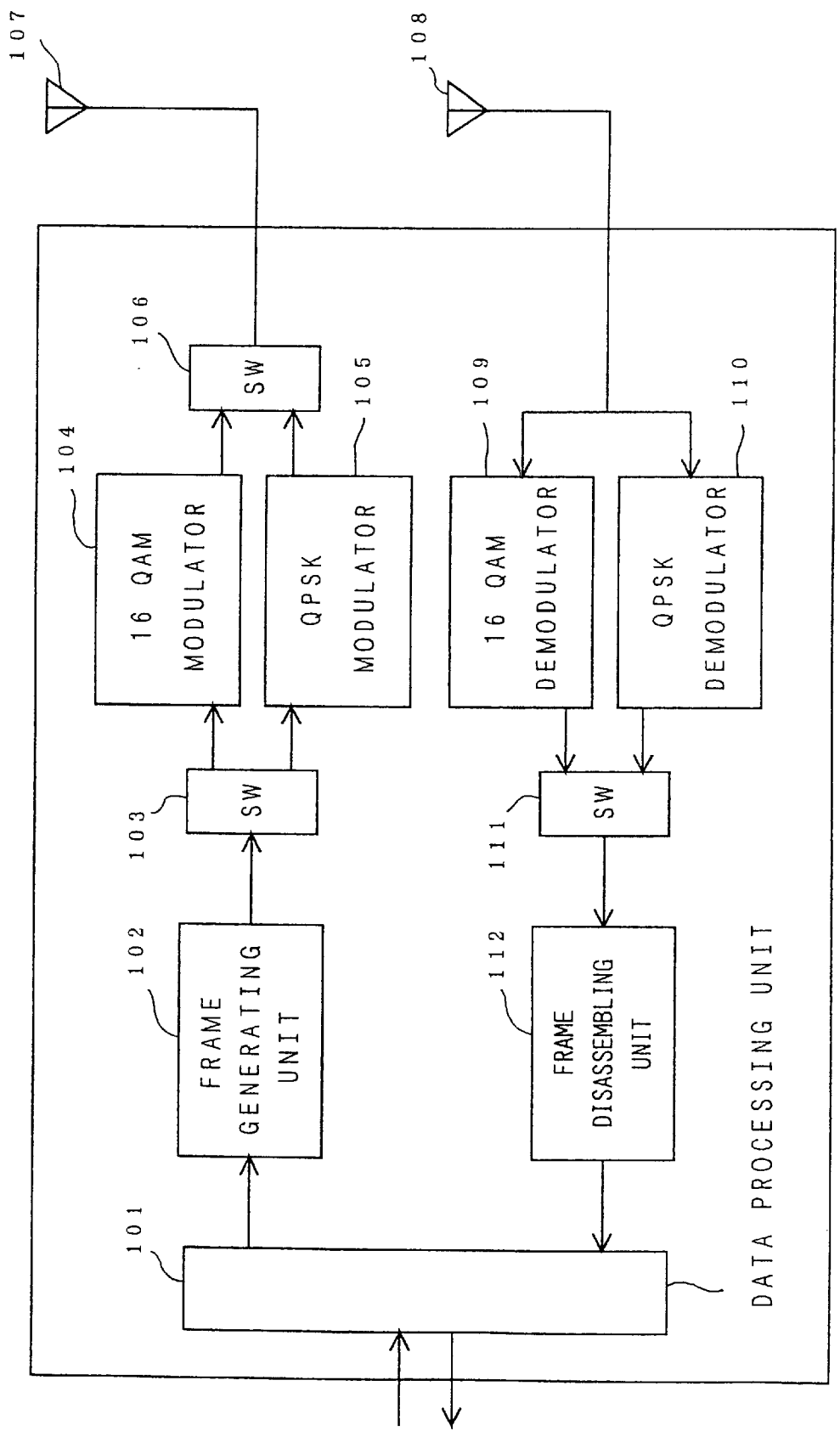
FIG. 1 shows a block diagram of a master device in a first embodiment of the present invention.

The communication method of the first embodiment of the present invention will be described referring to FIGS. 1 to 4. FIG. 1 represents a configuration of a master device of the first embodiment of the present invention. Reference numeral 101 represents a data processing unit for exchanging data to be transmitted or received and for allotting time slots. Reference numeral 102 represents a frame generating unit for assembling a downward frame using base band. Numeral 103 represents a changeover switch, 104 a 16 QAM modulator, 105 a QPSK modulator, 106 a changeover switch, and 107 a transmitting antenna. Numeral 108 represents a receiving antenna, 109 a 16 QAM demodulator, 110 a QPSK demodulator, and 111 a changeover switch. Numeral 112 represents a frame disassembling unit, which performs frame synchronizing of an upward frame, divides the data to time slots, and delivers the data to the data processing unit 101.

Figure 2:
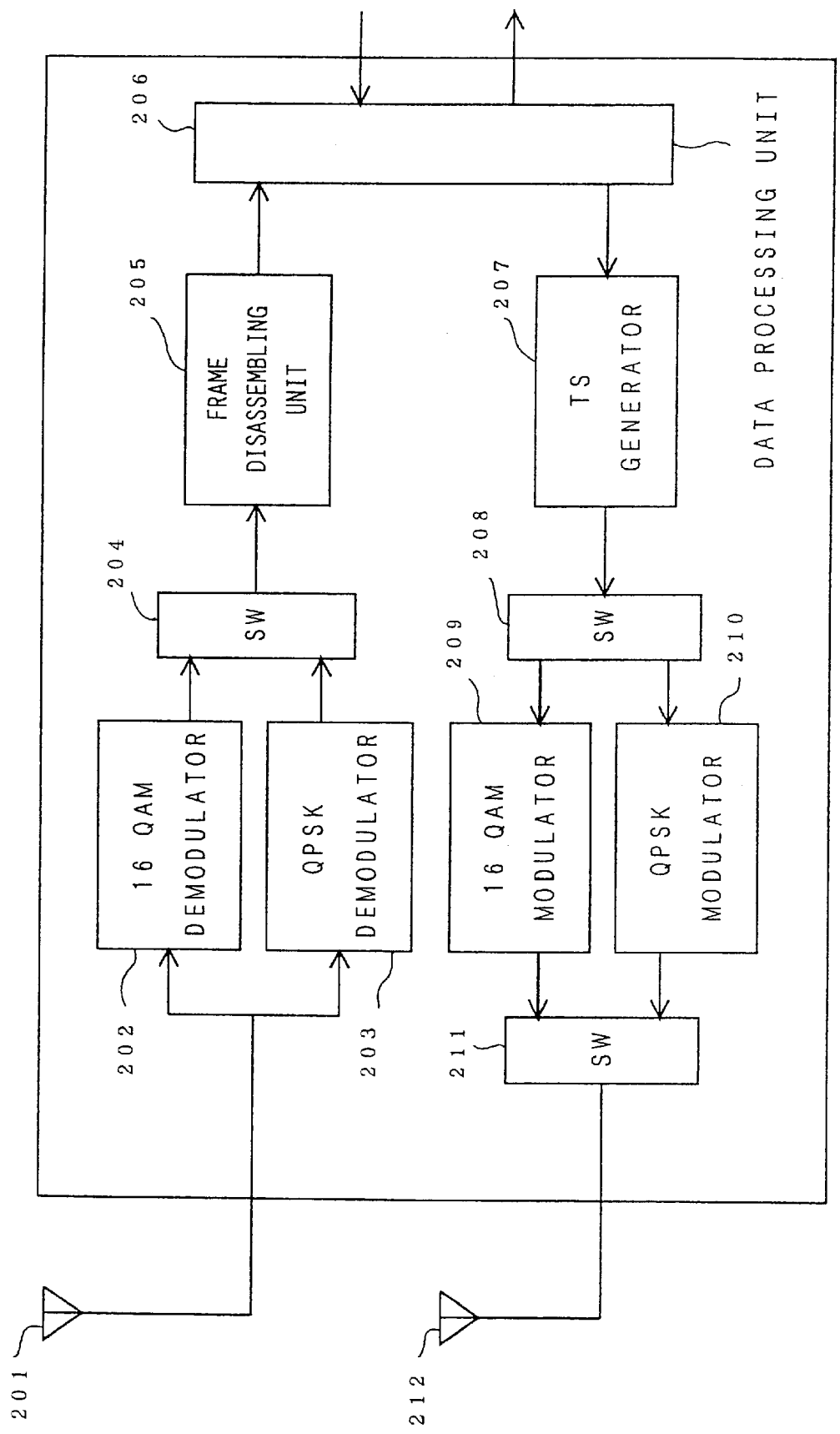
FIG. 2 shows a block diagram of a slave device in the first embodiment of the invention.

FIG. 2 shows a configuration of a slave device in the first embodiment of the present invention. Reference numeral 201 represents a receiving antenna, 202 a 16 QAM demodulator, 203 a QPSK demodulator, and 204 a changeover switch. Reference numeral 205 represents a frame disassembling unit, which performs frame synchronizing of the downward frame, divides the data to each time slot, and delivers the data to the data processing unit 206. The data processing unit 206 picks up only the data of the time slot directed to it and outputs the data, and further generates an information to start communication, inputs communication data and delivers the data to the time slot generator 207. The time slot generator 208 outputs a base band signal at time slot timing, at which transmission of the data from the data processing unit 206 is allowed. Reference numerals 208 and 211 each represents a changeover switch, 209 a 16 QAM demodulator, 210 a QPSK modulator, and 212 a transmitting antenna. As initial status, each changeover switch selects QPSK side.

Figure 3:
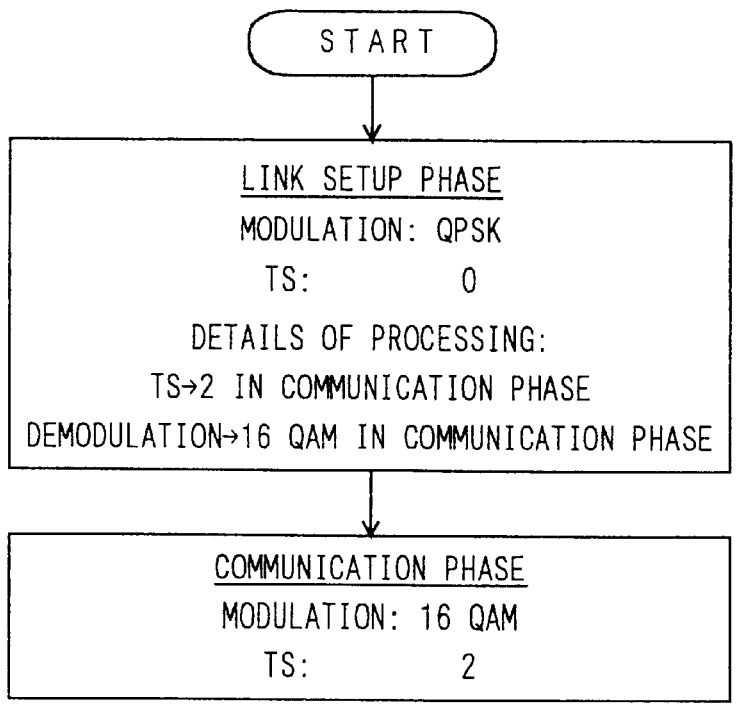
FIG. 3 is to explain operation of the first embodiment of the present invention.
Figure 4:
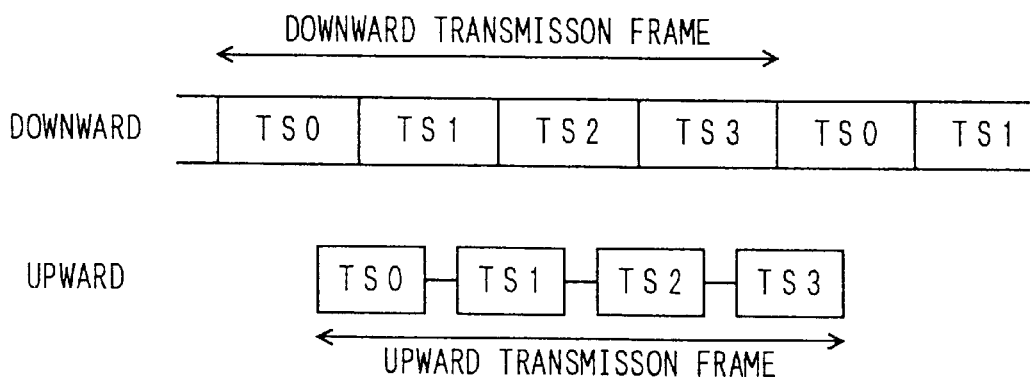
FIG. 4 is a block diagram of a transmission frame.

FIG. 3 shows operation of the communication method of the first embodiment of the present invention. The configuration of the transmission frame is the same as the conventional example shown in FIG. 4, but the time slots can be transmitted not only on QPSK but also on 16 QAM with the same symbol rate independently from each other. On 16 QAM, 4 bits can be transmitted per symbol. When transmitting on 16 QAM, the data can be transmitted at a rate of 80 kb/s per time slot in downward transmission and at 64 kb/s in upward transmission.

At the start of the communication, link must be set up at first, and time slot 0 (TS0) is allotted exclusively for this purpose. When a slave device such as PHS mobile station attempts to start communication, communication request and modulation method change request are transmitted on modulation method QPSK using TS0 of the upward transmission frame. A master device such as PHS base station receives it and communicates an empty time slot number "TS2" and a modulation method "16 QAM" using TS0 of the downward transmission frame. In case it is decided to use 16 QAM as modulation method, communication of 16 QAM is subsequently performed using TS2. When it is changed from the link setup phase to the communication phase, the slave device switches the modulation circuit and the demodulation circuit to the circuit of 16 QAM. The master device switches the modulation circuit and the demodulation circuit for each time slot.

In case the other slave device did not transmit request of the modulation method at first, QPSK is automatically selected. If the master device allots TS1 for communication, TS0 and TS1 are used on QPSK and TS2 is used on 16 QAM as a whole.

As described above, according to the communication method of a first embodiment of the present invention, an information to specify modulation method to be used in the communication phase is notified in the link setup phase. Accordingly, it is possible to select modulation method depending upon the request from the slave device, and high-speed transmission service can be provided. If the present invention is adopted in the existing system, high-speed service can be carried out without changing the existing slave device. Communication can be carried out by a new system even when the existing slave device is not equipped with demodulation function on 16 QAM, and this is because there is no need for the existing slave device to receive the time slot modulated by 16 QAM.

In the first embodiment as described above, the modulation method at high-speed service was set on 16 QAM, while modulation method such as multivalued 64 QAM or 256 QAM may be used. Also, three or more modulation methods may be used. If there is no need to perform high-speed communication, the modulation method may not be specified, or the same modulation method as in the link setup phase may be specified.

The present invention can also be applied when only one of the upward transmission frame or the downward transmission frame is the transmission frame with a plurality of time slots. Also, either the upward transmission frame or the downward transmission frame can be modulated by high-speed modulation.

(2nd Embodiment)

A second embodiment of the present invention is a communication method, in which an information to specify modulation method to be used in the communication phase is notified in the link setup phase, and communication is carried out with transmission frames having different carrier frequencies using different modulation methods.

Figure 5:
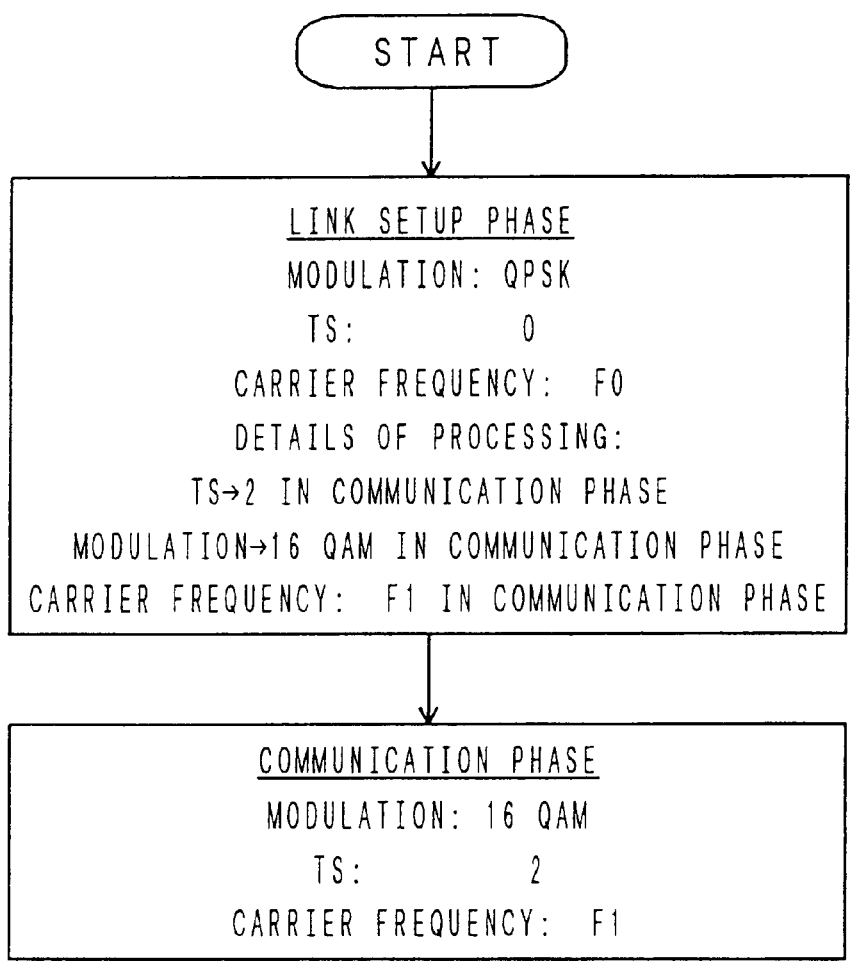
FIG. 5 is to explain operation of a second embodiment of the present invention.

FIG. 5 shows operation of the communication method of the second embodiment of the present invention. The configuration of the transmission frame is the same as in the conventional example shown in FIG. 4, but modulation method and carrier frequency are different between the link setup phase and the communication phase. The configurations of the master device and the slave device are almost the same as those shown in FIG. 1 and FIG. 2, while carrier frequencies of QPSK modulator and QPSK demodulator are F0D in downward transmission and F0U in upward transmission. Carrier frequencies of 16 QAM modulator and 16 QAM demodulator are F1D in downward transmission and F1U in upward transmission (these four frequencies are different from each other).

When communication is started, link must be set up at first. Time slot 0 (TS0) of transmission frame of carrier frequencies F0D/U is exclusively allotted from this purpose. When a slave device such as PHS mobile station attempts to start communication, communication request and modulation method change request are transmitted to TS0 of upward transmission frame where modulation method is QPSK at carrier frequency of F0U. A master device such as PHS base station receives the requests and notifies an empty time slot number "TS2", a modulation method "16 QAM", and carrier frequency "F1D/U" using TS0 of the downward transmission frame with carrier frequency F0D. When the modulation method and the carrier frequency are determined on 1:1 basis, there is no need to notify carrier frequency. If carrier frequency exclusively used for high-speed transmission is determined in advance, it will suffice to fix the modulation circuit and the demodulation circuit to the carrier frequency, and this makes it possible to simplify circuit configuration and control of transmission and receiving.

In case 16 QAM is decided as the modulation method, subsequent communication is carried out by 16 QAM using transmission frame with carrier frequency F1D/U. When it is changed from the link setup phase to the communication phase, the slave device switches over the modulation circuit and the demodulation circuit to a circuit where carrier frequency is F1U/D and the modulation method is 16 QAM. The master device operates modulation/demodulation circuit exclusively used for each frequency.

In case the slave device did not transmit the request to change the modulation method at first, QPSK with carrier frequency F0 is automatically selected.

As described above, according to the communication method of the second embodiment of the present invention, an information to specify modulation method and carrier frequency to be used in the communication phase is notified in the link setup phase. Accordingly, it is possible to select the modulation method and the carrier frequency in response to the request from the slave device, and a plurality of carrier frequencies and modulation methods can be used. This makes it possible to increase the number of time slots and the number of channels, and high-speed transmission service can be provided. If the present invention is adopted in the existing system, high-speed service can be provided on a new device without changing the existing slave device, and service can be provided to more slave devices.

In the second embodiment described above, modulation mode at high-speed service was set to 16 QAM, while multivalued modulation method may be used. Modulation method may be determined for each carrier frequency or modulation method may be freely selected irrespective of carrier frequency and time slot.

(3rd Embodiment)

A third embodiment of the present invention is a communication method, in which an information to specify modulation method of high-speed symbol rate to be used in the communication phase is notified in the link setup phase.

Figure 6:
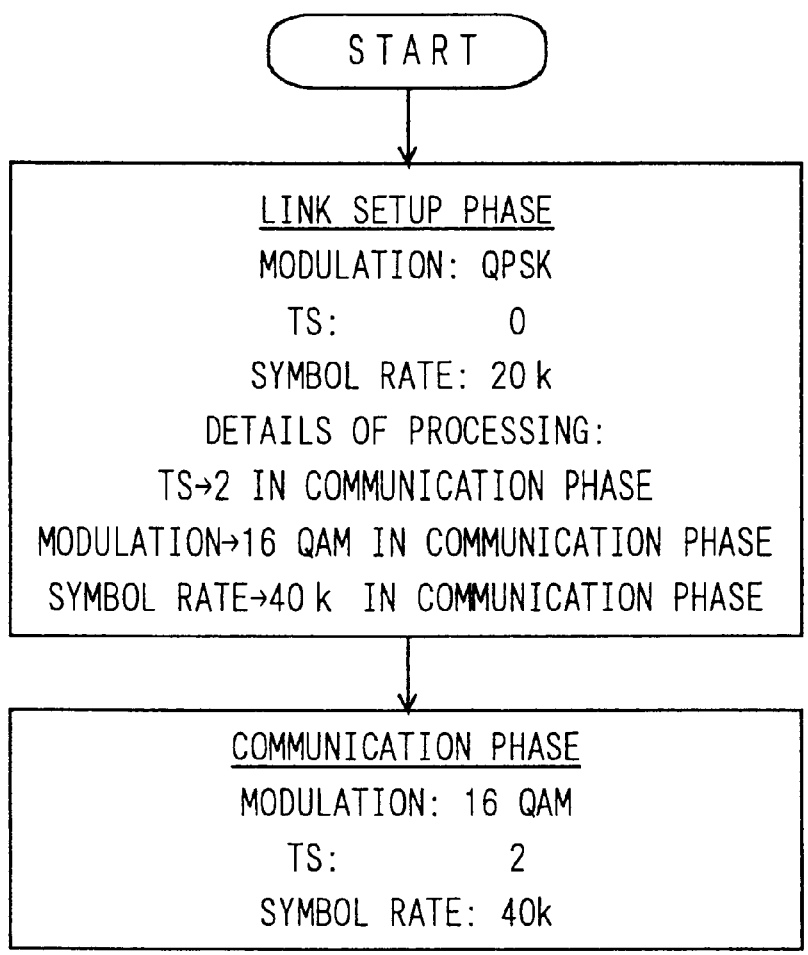
FIG. 6 is to explain operation of a third embodiment of the present invention.

FIG. 6 shows operation of the communication method of the third embodiment of the present invention. The configuration of the transmission frame is the same as the conventional example shown in FIG. 4, and time slots are designed in such manner that transmission can be provided at 16 QAM with double symbol rate. Therefore, when transmitting at 16 QAM at double symbol rate, the data can be transmitted at a rate of 80 kb/s in downward transmission and at 64 kb/s in upward transmission per time slot. The configurations of the master device and the slave devices are almost the same as those shown in FIG. 1 and FIG. 2, except that symbol rate of QPSK modulator and QPSK demodulator is 20 k symbol/s per time slot, and symbol rate of 16 QAM modulator and 16 QAM demodulator is 40 k symbol/s.

At the start of the communication, link must be set up at first. Time slot 0 (TS0) is allotted exclusively for this purpose. When a slave device such as a PHS mobile station attempts to start communication, communication request and modulation method change request are transmitted by modulation method QPSK using TS0 of the upward transmission frame at first. A master device such as a PHS base station receive the requests and notifies an empty time slot number "TS2", a modulation method specifying information "16 QAM" and a symbol rate information "40" using TS0 of the downward transmission. In case modulation method and symbol rate match each other on 1:1 basis, there is no need to notify symbol rate information. In case 16 QAM is determined as the modulation method, subsequent communication is performed in 16 QAM at double symbol rate using TS2. When it is changed from the link setup phase to the communication phase, the slave device switches the modulation circuit and the demodulation circuit to a circuit of 16 QAM at double symbol rate. The master device switches the modulation circuit and the demodulation circuit for each time slot.

In case the slave device did not transmit the request to change the modulation method at first, QPSK of the same symbol rate as the link setup phase is automatically selected as the modulation method.

As described above, according to the communication method of the third embodiment of the present invention, an information to specify the modulation method having different symbol rate to be used in the communication phase is notified in the link setup phase. Therefore, the modulation method with higher symbol rate can be selected according to the request from the slave device, and high-speed transmission service can be provided. If the present invention is adopted in the existing system, high-speed communication service can be provided using a new device without changing the existing slave device.

In the third embodiment as described above, the symbol rate was set to double rate at the high-speed communication service, while symbol rate at higher speed may be selected. Or, symbol rate may be set to ½, and high-speed communication may be provided using multivalued modulation method twice as high as QPSK. In case symbol rate is changed, carrier frequency may be changed.

In the first to the third embodiments as described above, examples were taken on a mobile wireless communication system such as PHS, while the invention can also be applied to wire communication system such as LAN, which uses coaxial cable or optical fiber cable as transmission media. In such cases, coaxial cable adapter or photoelectric converter may be used instead of transmitting antenna or receiving antenna as transmission interface means or receiving interface means. The present invention can also be applied to a communication system with wire upward transmission and wireless downward transmission (or vice versa).

(4th Embodiment)

Figure 7:
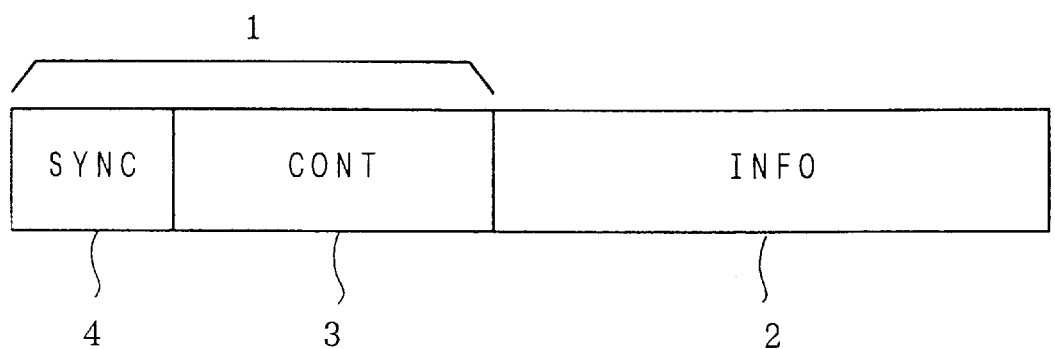
FIG. 7 shows a configuration of a frame in an embodiment of the present invention.

FIG. 7 shows a configuration of a frame in a fourth embodiment of the present invention. In FIG. 7, the frame is designed in such manner that it is transmitted by π/4 shift QPSK, and the frame comprises a common unit 1 containing a frame synchronizing pattern 3 and a control unit 4 and to be received by all of the terminal devices and a communication information unit 2 to be transmitted by π/4 shift QPSK in normal transmission and by 16 QAM in high-speed transmission and to be received only by a specific terminal device. In both cases where the communication information unit 2 is transmitted by π/4 shift QPSK or by 16 QAM, it is desirable that symbol rate is made equal to that of the common unit 1.

Figure 8:
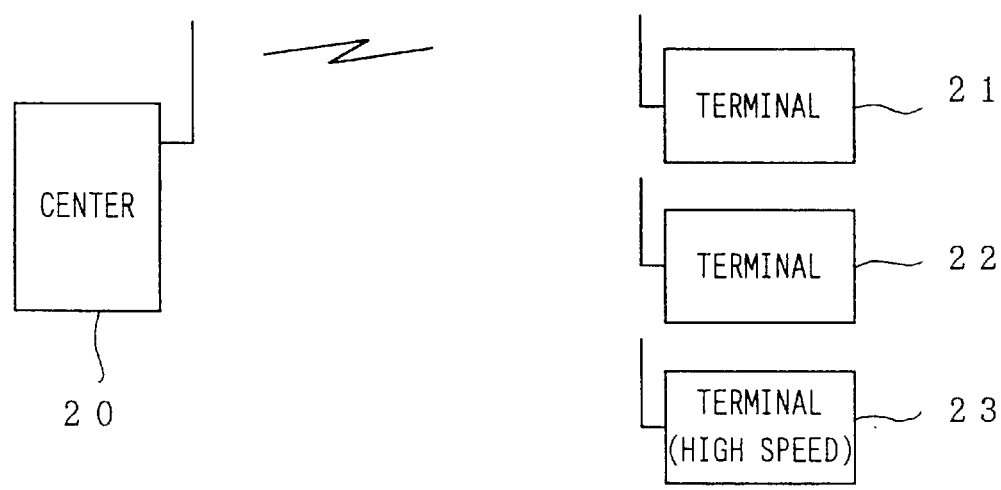
FIG. 8 shows a configuration of a communication system using a data transmission method of the present invention.

FIG. 8 shows a configuration of a communication system using the data transmission method of the present invention. In FIG. 8, the communication system using the data transmission method of the present invention comprises a center device 20, a plurality of conventional type terminal devices 21 and 22 with a π/4 shift QPSK demodulator incorporated in it, and a terminal device 23 for high-speed transmission having a 16 QAM demodulator in addition to the π/4 shift QPSK demodulator.

Figure 9:
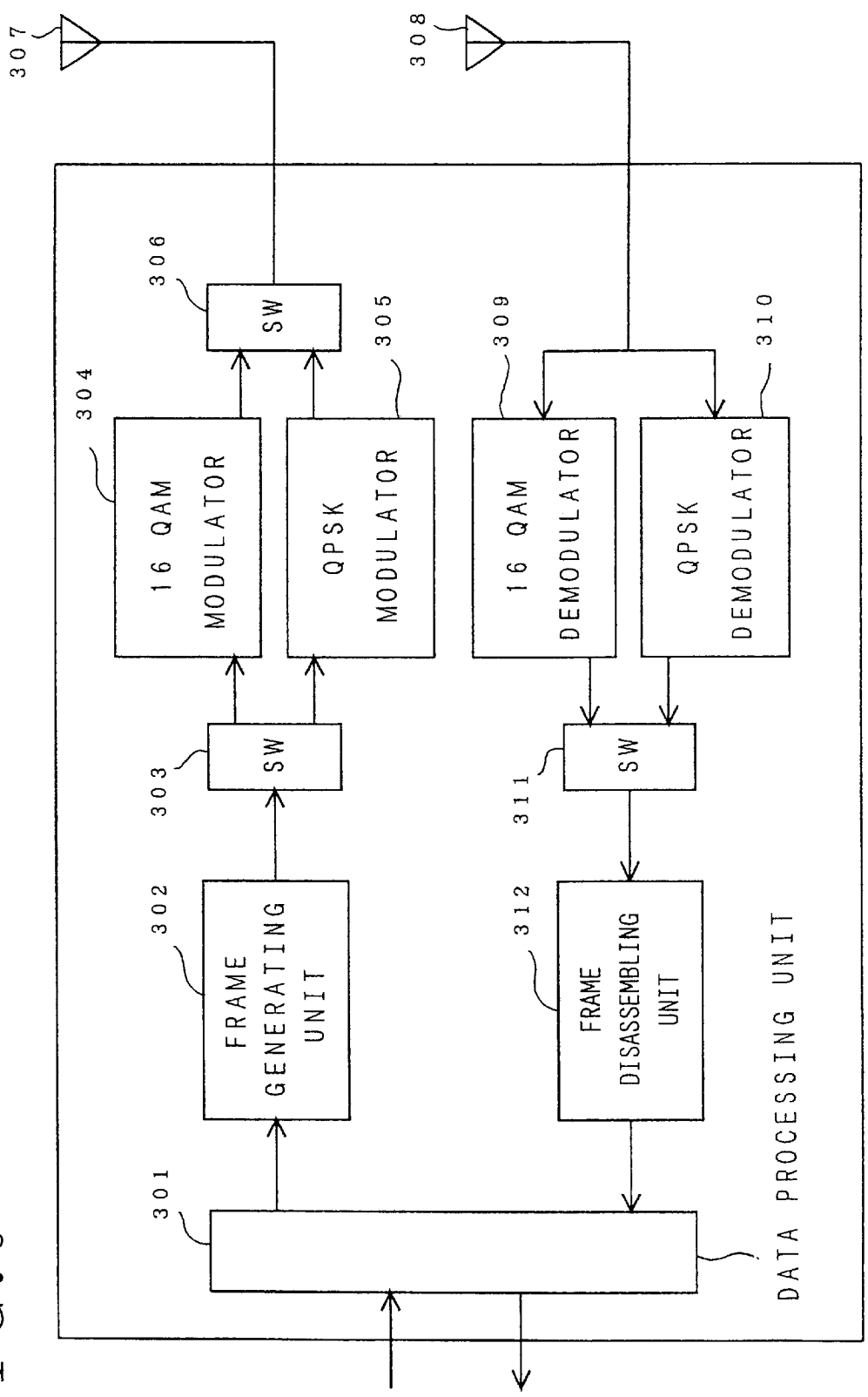
FIG. 9 shows a configuration of a center device in the embodiment of the present invention.

FIG. 9 shows a configuration of a center device 20 in an embodiment of the present invention. The center device in the embodiment of the present invention comprises a data processing unit 301 for exchanging data to be transmitted or received and for inputting and outputting data or control information, a frame generating unit 302 for assembling a downward frame with base band according to the information from the data processing unit 301, a first changeover switch 303, a 16 QAM modulator 304, a π/4 QPSK modulator 305, a second changeover switch 306, a transmitting antenna 307, a receiving antenna 308, a 16 QAM demodulator 309, a π/4 shift QPSK demodulator 310, a third changeover switch 311, and a frame disassembling unit 312 for performing frame synchronizing of the upward frame, picking up various types of information from the frame and delivering the information to the data processing unit 301.

Figure 10:
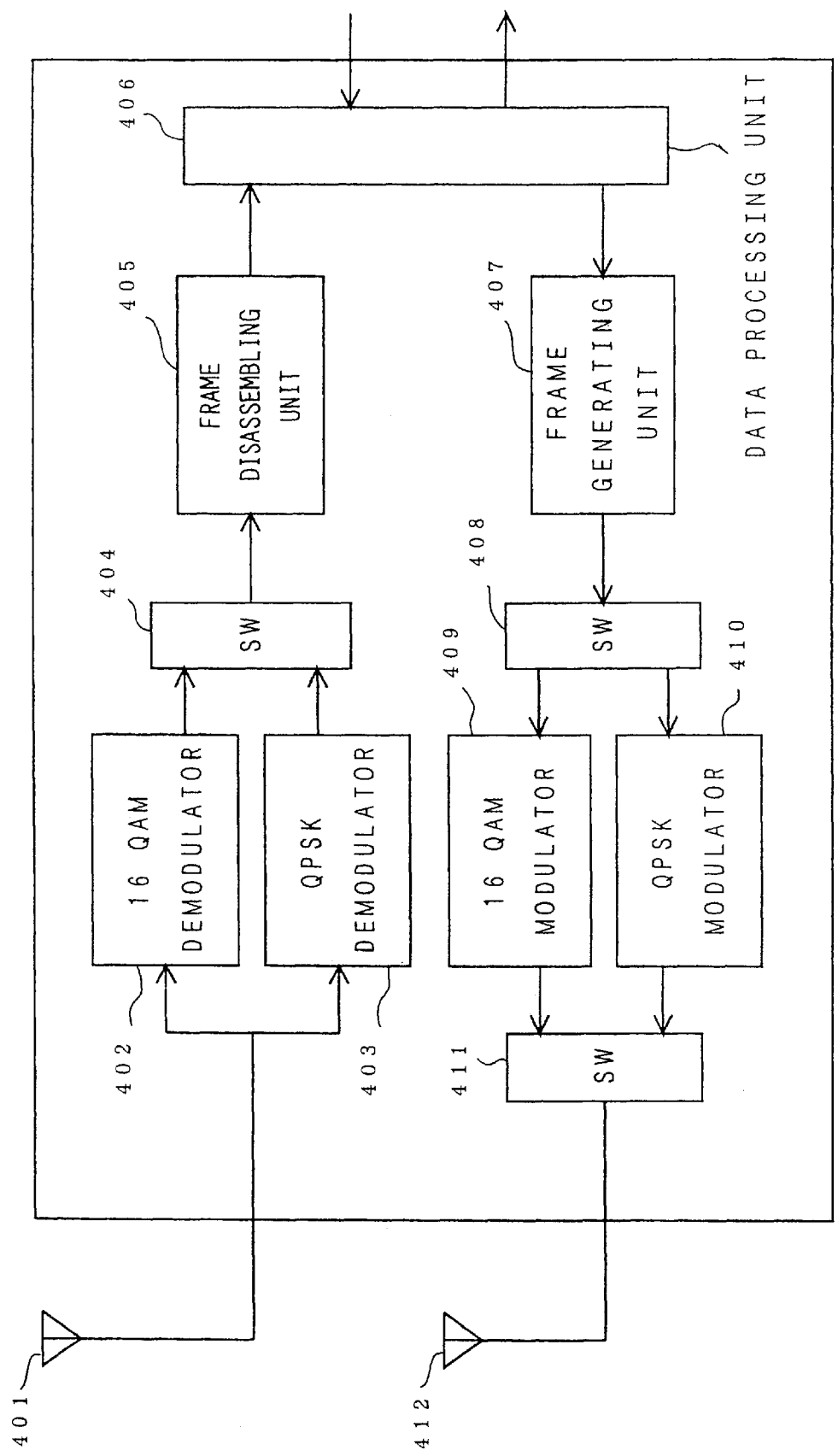
FIG. 10 shows a configuration of a terminal device in the embodiment of the present invention.
Figure 11:
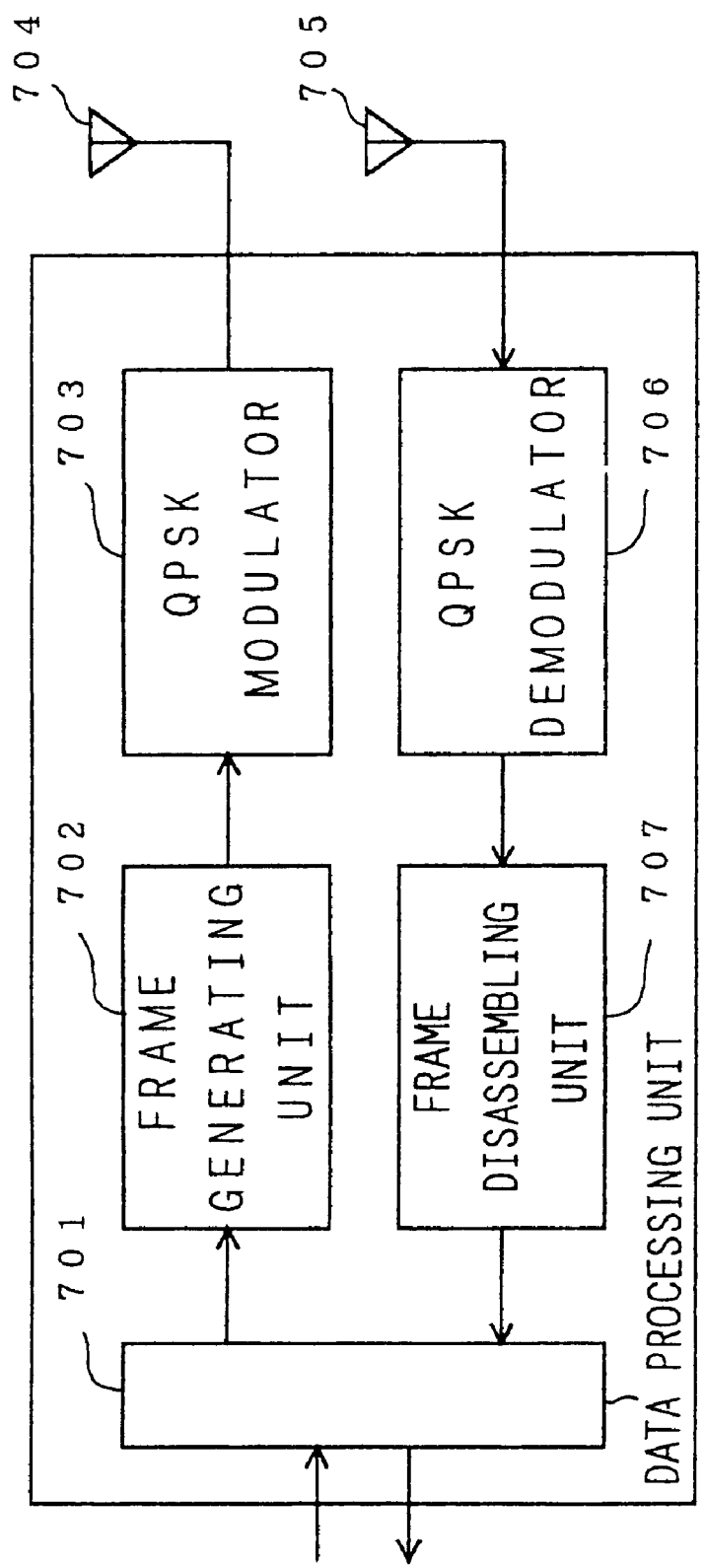
FIG. 11 is a block diagram of a master device in a conventional example.
Figure 12:
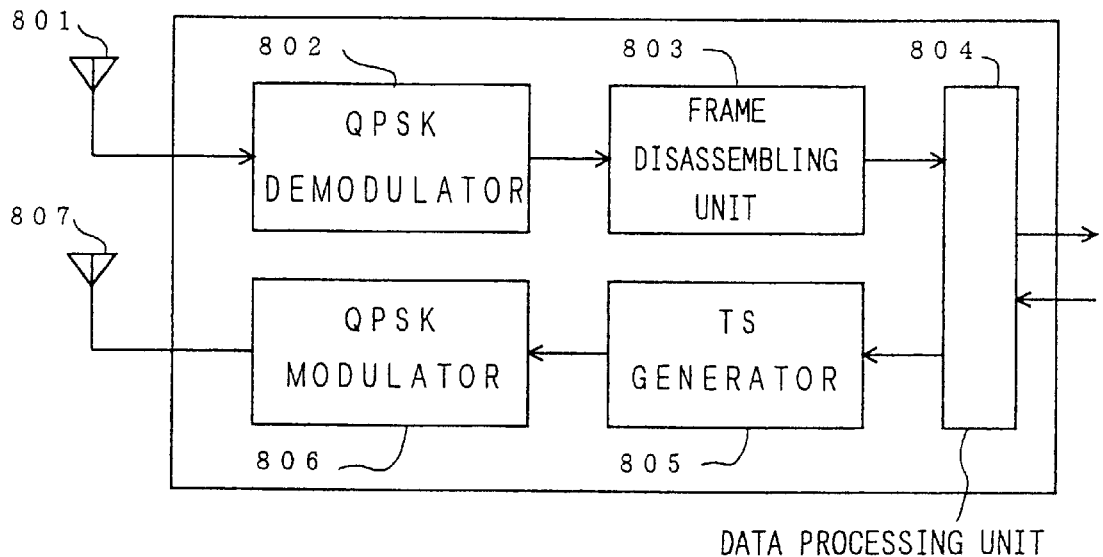
FIG. 12 is a block diagram of a slave device in the conventional example.
Figure 13:
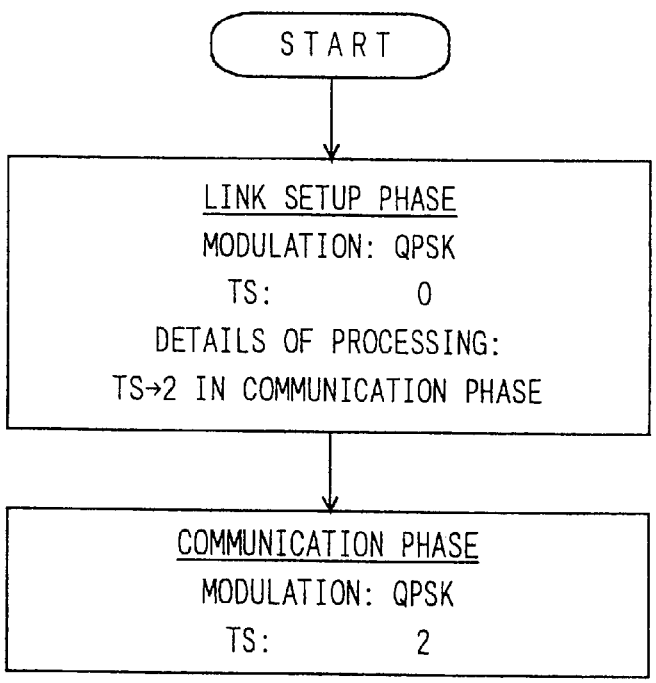
FIG. 13 is to explain operation in the conventional example.
Figure 14:
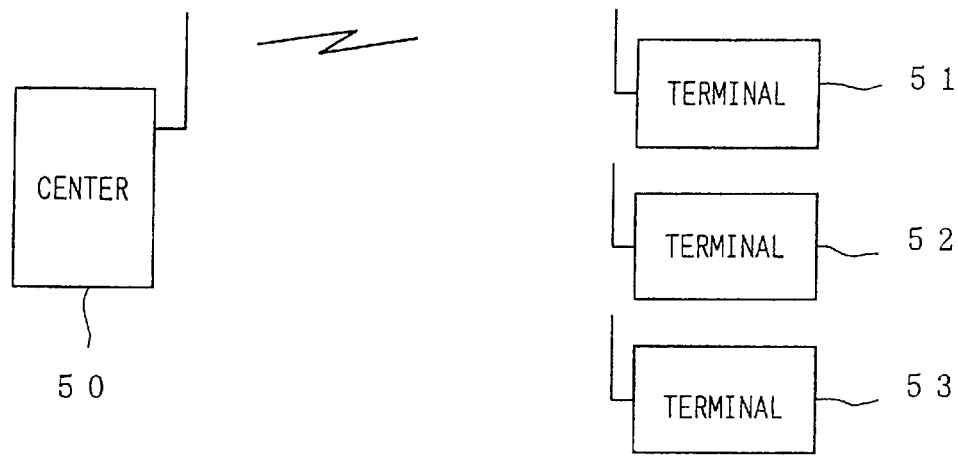
FIG. 14 shows a configuration of a conventional type communication system.
Figure 15:
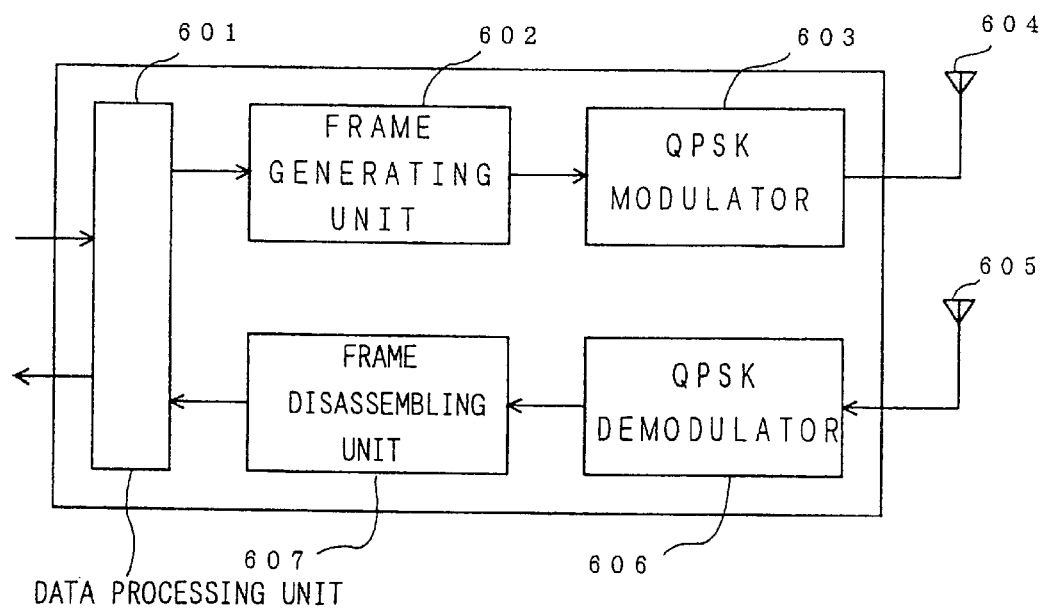
FIG. 15 shows a configuration of a center device in a conventional type communication system.
Figure 16:
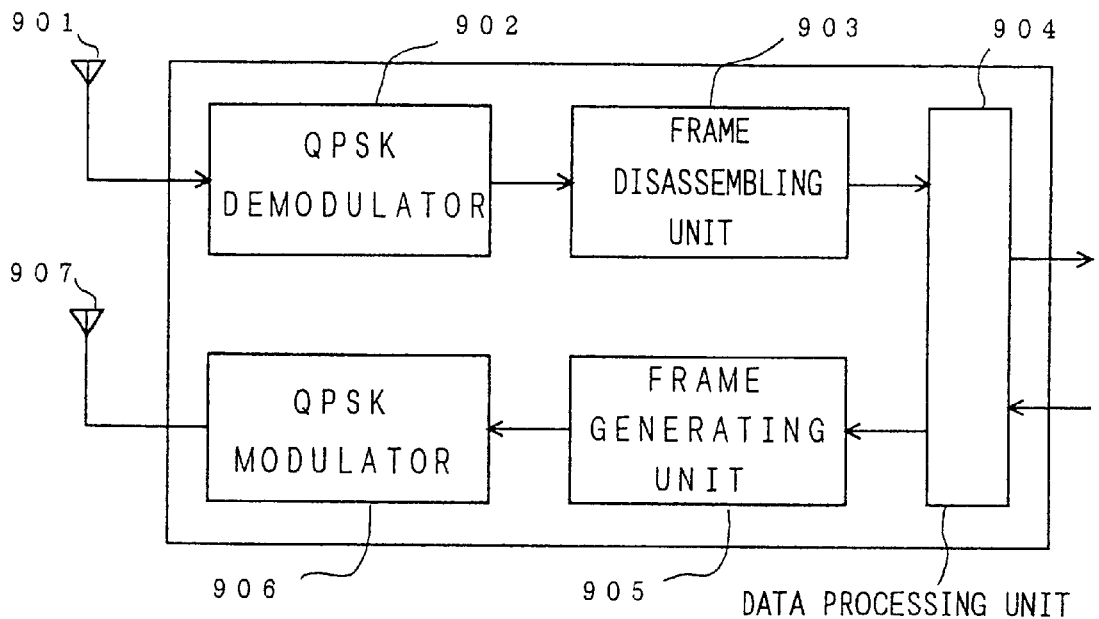
FIG. 16 shows a configuration of a terminal device in the conventional type communication system.
Figure 17:
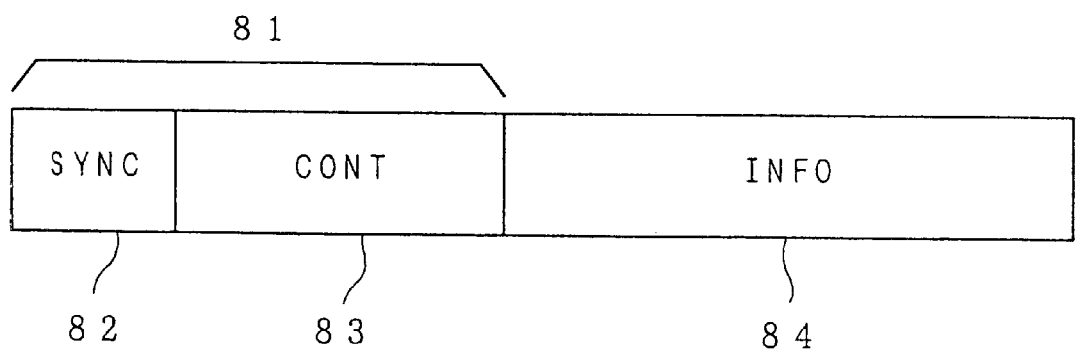
FIG. 17 shows a configuration of a conventional type frame.

FIG. 10 shows a configuration of a terminal device in an embodiment of the present invention. The terminal device in the embodiment of the present invention comprises a receiving antenna 410, a 16 QAM demodulator 402, a π/4 shift QPSK demodulator 403, a first changeover switch 404, a frame disassembling unit 405 for performing frame synchronizing of a downward frame, dividing various types of information in the frame, and delivering the information to a data processing unit 406, a data processing unit 406 for picking up and outputting only communication information directed to own station, generating an information to start the communication, inputting a communication information and delivering the information to the frame generating unit 407, a frame generating unit 407 for assembling an upward frame with base band according to the information from the data processing unit 406, a second changeover switch 408, a 16 QAM modulator 409, a π/4 shift QPSK modulator 410, a third changeover switch 411, and a transmitting antenna 412.

Here, it is supposed that each changeover switch selects π/4 shift QPSK side as initial state.

In the following, description will be given only to the communication from the center device to the terminal devices 21 to 23, and description on the communication in reverse direction will not be given here because the same applies to the communication in reverse direction.

The center device transmits data using the frame with only the π/4 shift QPSK to any of the terminal devices. Therefore, operation of the terminal device is the same as that of the conventional type example. However, in case high-speed transmission is to be performed to the terminal device 23, the center device 20 puts an information to start high-speed transmission from now on to a communication information unit 2 of the frame directed to the terminal device 23. Upon receipt of the information, the terminal device 23 demodulates the common unit 1 by π/4 shift QPSK and demodulates the communication information unit 2 by 16 QAM.

In this case, this frame also reaches the conventional type terminal devices 21 and 22. Because the common unit 1 is modulated by π/4 shift QPSK as in the past, frame synchronizing is maintained and destination of the frame can be identified by the control unit 4. The result of demodulation of the communication information unit 2 is turned to indefinite, but there is no problem because no high-speed transmission is performed to the conventional type terminal device not provided with a receiving means for receiving information at high speed.

In the frame configuration shown in FIG. 7, description has been given on the case where the frame is transmitted by π/4 shift QPSK and comprises a common unit 1 containing a frame synchronizing pattern 3 and a control unit 4 and to be received by all terminal devices and a communication information unit 2 to be transmitted by π/4 shift QPSK in normal transmission and by 16 QAM in high-speed transmission and to be received only by a specific terminal device. Although not shown in the figure, it may be designed in such manner that the frame is transmitted by π/4 shift QPSK and comprises a common unit containing a frame synchronizing pattern 3 and a control unit 4 and to be received by all terminal devices, and a communication information unit 2 to be transmitted by π/4 shift QPSK in normal transmission and by 8 PSK in high-speed transmission and to be received only by a specific terminal device. In this case, also, it is desirable that symbol rate is made equal to that of the common unit 1 irrespective of whether π/4 shift QPSK or 8 PSK is used in the communication information unit 2. It is needless to say that the terminal device 23 shown in FIG. 8 is incorporated with a 8 PSK demodulator in addition to the π/4 shift QPSK demodulator.

As described above, it is possible according to the embodiment of the present invention to double the speed of the communication information unit 2. Further, it is possible to attain such an effect that symbol synchronizing can be easily maintained even in a conventional type terminal device because symbol rate is maintained at a constant level in both 16 QAM transmission and 8 PSK transmission.

As it is evident from the above embodiments, according to the present invention, the modulation method of time slots to be used in the communication phase is determined in the link setup phase by the master device and the slave device. As a result, such superb effects can be attained that high-speed modulation method can be selected and high-speed transmission service can be provided.

Further, according to the present invention, only the modulation method of time slot used by the slave device concerned is changed, and there is no influence on communication of the other slave devices. Thus, this can be incorporated in the existing communication system and cost can be reduced.

Further, according to the present invention, it is possible to perform high-speed transmission by increasing number of transmittable bits per unit time in a region of the frame to be received only by a specific terminal device, i.e. by turning the information bit to multivalued bit. As a result, it is possible to attain such an effect that information can be transmitted at higher speed than in the conventional system in a manner interchangeable with an upper grade system.

While the present invention have been described with reference to the preferred embodiments hereinabove, various modifications and variations may be made without departing from the scope of the invention set forth hereinbelow.

What is claimed is:

1. A method of communication between a master device and a plurality of slave devices, wherein: (a) transmission from said master device to said slave devices use a downward transmission frame and transmission from said slave devices to said master device use an upward transmission frame, (b) at least one of the upward and downward transmission frames has a plurality of time slots, and (c) a first modulation method and a second modulation method are used to modulate said transmission between said master device and said slave devices, the method comprising:

I. in a link setup phase:
(a). transmitting information, specifying a communication time slot to be used in a communication phase, using one time slot each of said upward and downward transmission frames, and transmitting said information specifying a time slot to be used modulated by the first modulation method;
(b). transmitting information between said master and said slave(s) specifying a modulation method to be used in a communication phase;

wherein, if high speed communication is to be performed, the information specifying a modulation method to be used is the second modulation method, and if high speed communication is not to be performed, the information specifying a modulation method to be used is the first modulation method; and II. in a communication phase, communicating between said master and said slave(s) using:
(a) said time slot specified by the information specifying said time slot to be used; and
(b) said modulation method specified by the information specifying said modulation method to be used; and wherein, if the second modulation method is not specified by the information specifying said modulation method to be used, communicating using:
(a) said time slot specified by the information specifying a time slot to be used; and
(a) said first modulation method.

2. The method of communicating as claimed in claim 1 further comprising modulating a carrier frequency of the transmission frame during said communication phase according to said second modulation method, and using a different carrier frequency of the transmission frame used in said link setup phase.

3. The method of communicating as claimed in claim 1 further comprising said second modulation method having a higher multivalued number than the multivalue number of said first modulation method.

4. The method of communicating as claimed in claim 1 further comprising said second modulation method having a higher symbol rate than the symbol rate of said first modulation method.

5. A master communication device comprising:
a data processing unit adapted to exchange data to be transmitted or received and adapted to allot time slots;
a frame generating unit adapted to input transmission data from said data processing unit, and adapted to assemble a downward frame with a base band;
a plurality of modulators having different modulation methods;
a first changeover switch adapted to connect said frame generating unit to one of said plurality of modulators;
a transmission interface adapted to transmit information to a transmission line;
a second changeover switch adapted to connect the modulator connected to said first changeover switch to said transmission interface;
a receiving interface adapted to receive data from said transmission line;
a plurality of demodulators adapted to demodulate signals with different modulation methods;
a frame disassembling unit adapted to perform frame synchronizing of said upward frame, adapted to divide data to each time slot, and adapted to deliver data to said data processing unit; and
a third changeover switch adapted to connect one of said plurality of demodulators to said frame disassembling unit.

6. A method of transmitting data, from a central device to a plurality of terminal devices by means of a frame, comprising a common unit and an individual unit, at a predetermined cycle, comprising:
transmitting a common unit of said frame by a first modulation method;

receiving said common unit by all said terminal devices;
transmitting an individual unit by a second modulation method having a higher number of bits per unit of time than said first modulation method; and
receiving said individual unit by less than all of the said terminal devices.

7. A data transmission system comprising:
a central device;
a plurality of terminal devices adapted to use a frame at a predetermined cycle;
wherein said frame comprises a common unit that is adapted to be received by all said terminal devices and an individual unit that is adapted to be received by a part of said terminal devices;
a first modulation means, having a predetermined number of bits per unit of time, adapted to transmit said common unit;
a second modulation means, having a higher number of bits per unit of time than said first modulation means, adapted to transmit said individual unit.

8. A system as claimed in claim 7 wherein said first modulation means is 7r/4 shift QPSK and said second modulation means is 16 QAM.

9. A system as claimed in claim 7 wherein said first modulation means is 7r/4 shift QPSK and said second modulation means is 8 PSK.

10. A system as claimed in claim 7 wherein said second modulation means has a symbol rate that is 5 equal to the symbol rate of said first modulation means.

11. A system as claimed in claim 10 wherein said first modulation means is 7r/4 shift QPSK and said second modulation means is 16 QAM.

12. A system as claimed in claim 10 wherein said first modulation means is 7r/4 shift QPSK and said second modulation means is 8 PSK.

13. A data communication system for communicating between a central device and a plurality of terminal devices comprising:
a central device forming a frame at a predetermined cycle, and
a plurality of terminal devices adapted to use a frame at a predetermined cycle;
wherein said central device frame comprises:
a common unit, adapted to be modulated by a first modulation method having a predetermined number of transmittable bits per unit of time, and adapted to be received by all of said plural terminals so that data transmission is performed from said central device to said terminal devices; and
an individual unit, adapted to be modulated by a second modulation method having a higher number of transmittable bits per unit of time than said first modulation method, and adapted to be received by a part of said terminal devices;
a first demodulation means corresponding to said first modulation method, and that is adapted to demodulate said common unit; and
a second demodulation means corresponding to said second modulation method, and that is adapted to demodulate said individual unit,
wherein said frame comprises a common unit that is adapted to be received by all said terminal devices and an individual unit that is adapted to be received by a part of said terminal devices;
a first modulation means, having a predetermined number of bits per unit of time, adapted to transmit said common unit;
a second modulation means, having a higher number of bits per unit of time than said first modulation means, adapted to transmit said individual unit.

14. A central device, adapted to be part of a data communication system and adapted to communicate with a plurality of terminal devices, said central device comprising:
a frame forming means adapted to form a frame at a predetermined cycle;
wherein said frame is adapted to transmit data from said central device to said terminal devices and contains;
a common unit that is adapted to be received by all of said terminals, and
an individual unit that is adapted to be received by a part of said terminal devices;
a first modulation means for modulating said common unit by a first modulation method having a predetermined number of transmittable bits per unit of time; and
a second modulation means for modulating said individual unit by a second modulation method having a higher number of transmittable bits per unit of time than said first modulation method.

15. A terminal device, adapted to be a part of a data communication system and adapted to communicate with a central device that is adapted to communicate with a plurality of terminal devices;
wherein said terminal device comprises a frame forming means adapted to form a frame at a predetermined cycle;
wherein said frame is adapted to transmit data from said central device to said terminal devices and contains;
a common unit that is adapted to be received by all of said terminal devices, and
an individual unit that is adapted to be received by at least one of said terminal devices;
a first modulation means for modulating said common unit by a first modulation method having a predetermined number of transmittable bits per unit of time; and
a second modulation means for modulating said individual unit by a second modulation method having a higher number of transmittable bits per unit of time than said first modulation method,
wherein said terminal device further comprises:
a first demodulation means adapted to demodulate said common unit transmitted from said central device by means of said first modulation method; and
a second demodulation means adapted to demodulate said individual unit transmitted from said central device by means of said second modulation method.

16. A terminal device, adapted to be a part of a data communication system and adapted to communicate with a central device arranged to transmit data to a plurality of terminal devices in the form of consecutive frames each of which includes a common unit that is adapted to be received by all of said terminal devices, and an individual unit that is adapted to be received by a part of said terminal devices, said terminal device comprising:
a first demodulation means adapted to demodulate said common unit transmitted from said central device by means of a first modulation method; and
a second demodulation means adapted to demodulate said individual unit transmitted from said central device by means of a second modulation method.

17. A terminal device, adapted to be a part of a data communication system and adapted to communicate with a central device, said terminal device comprising:

a first demodulation means adapted to demodulate a common unit transmitted from said central device by means of a first modulation method, said common unit being included in each frame by which said central device transmits data to said terminal device, said common unit being adapted to be received by a plurality of said terminal devices all forming said communication system; and a second demodulation means adapted to demodulate an individual unit transmitted from said central device by means of a second modulation method, said individual unit being included in each of said frames and adapted to be received by at least one of said terminal devices.

* * * * *